US005699828A

United States Patent [19]

Helmsderfer

[11] Patent Number: 5,699,828
[45] Date of Patent: Dec. 23, 1997

[54] COVER ASSEMBLY WITH INTEGRAL MEASUREMENT INDICIA FOR COVERING UNDERSINK PIPING

[76] Inventor: John A. Helmsderfer, 2151 Luray Ave., Cincinnati, Ohio 45206

[21] Appl. No.: 735,132

[22] Filed: Oct. 22, 1996

Related U.S. Application Data

[63] Continuation-in-part of Ser. No. 490,599, Jun. 6, 1995, which is a continuation-in-part of Ser. No. 337,971, Nov. 14, 1994, Pat. No. 5,564,463, which is a continuation-in-part of Ser. No. 271,439, Jul. 7, 1994, Pat. No. 5,586,568, which is a continuation-in-part of Ser. No. 146,999, Oct. 29, 1993, Pat. No. 5,341,830, and a continuation-in-part of Ser. No. 675,779, Jul. 5, 1996, Pat. No. 5,649,566, which is a division of Ser. No. 271,439, Jul. 7, 1994.

[51] Int. Cl.$^6$ ..................................................... F16L 59/18
[52] U.S. Cl. .................. 137/375; 137/247.49; 285/47; 138/104; 138/159; 138/178
[58] Field of Search ..................... 137/375, 247.49; 285/45, 47; 138/104, 155, 157, 158, 159, 160, 161, 178

[56] References Cited

U.S. PATENT DOCUMENTS

| | | | |
|---|---|---|---|
| 411,115 | 9/1889 | Wendell | 138/159 |
| 2,140,308 | 1/1938 | Belshaw | 285/47 X |
| 2,449,265 | 9/1948 | Williams | 138/104 X |
| 2,650,180 | 8/1953 | Walker | 137/375 |
| 2,761,949 | 9/1956 | Colton | 285/47 X |
| 2,841,203 | 7/1958 | Gronemeyer | 138/160 X |
| 2,937,662 | 5/1960 | Green | 285/47 |
| 3,014,827 | 12/1961 | Clinchy et al. | 138/161 |
| 3,153,546 | 10/1964 | Dunn | 285/47 X |
| 3,402,731 | 9/1968 | Martin | 137/375 |
| 3,559,694 | 2/1971 | Volberg | 285/47 X |
| 3,598,157 | 8/1971 | Farr et al. | 138/157 |
| 3,790,418 | 2/1974 | Huvey et al. | 137/375 X |
| 3,801,140 | 4/1974 | Keller | 285/47 |
| 3,960,181 | 6/1976 | Baur et al. | 138/178 |
| 4,416,309 | 11/1983 | Salim | 138/104 |
| 4,463,780 | 8/1984 | Schultz et al. | 138/178 |
| 4,473,244 | 9/1984 | Hill | 137/375 X |
| 4,516,278 | 5/1985 | Lamond | 4/679 |
| 4,595,615 | 6/1986 | Cohen | 138/155 X |
| 4,667,505 | 5/1987 | Sharp | 138/161 X |
| 4,669,509 | 6/1987 | Botsolas | 138/178 |
| 4,705,302 | 11/1987 | Beiley | 285/47 |
| 4,746,147 | 5/1988 | Walker | 285/47 X |
| 4,804,210 | 2/1989 | Hancock | 285/47 |
| 4,840,201 | 6/1989 | Botsolas | 138/178 |
| 5,002,716 | 3/1991 | Van Dijck | 285/47 X |
| 5,025,836 | 6/1991 | Botsolas | 138/178 X |
| 5,054,513 | 10/1991 | Trueb et al. | 137/375 |
| 5,055,334 | 10/1991 | Lechuga | 137/375 X |
| 5,158,114 | 10/1992 | Botsolas | 137/375 X |
| 5,163,469 | 11/1992 | Trueb et al. | 137/375 |
| 5,183,299 | 2/1993 | Halberstrom et al. | 285/47 |
| 5,193,786 | 3/1993 | Guenther | 256/59 X |
| 5,259,410 | 11/1993 | Trueb et al. | 137/375 |
| 5,303,730 | 4/1994 | Trueb et al. | 137/375 |
| 5,341,830 | 8/1994 | Helmsderfer et al. | 137/15 |
| 5,348,044 | 9/1994 | Eugene et al. | 137/375 X |
| 5,360,031 | 11/1994 | Trueb et al. | 137/375 |
| 5,369,818 | 12/1994 | Barnum et al. | 4/624 |

(List continued on next page.)

FOREIGN PATENT DOCUMENTS

| | | |
|---|---|---|
| 1249974 | 2/1989 | Canada. |
| 2714576 | 5/1978 | Germany. |
| 0004201 | 2/1899 | United Kingdom ................. 138/158 |

Primary Examiner—John Rivell
Attorney, Agent, or Firm—Wood, Herron & Evans, LLP

[57] ABSTRACT

An insulative cover assembly for insulating a P-trap drain piping assembly comprises a unitary body with a first cover section and a second cover section, the first cover section having an elongated body terminating in an approximately 180° bend, and the second cover section having an elongated body terminating in an approximately 90°. The first and second cover sections each include a longitudinal slit thereon for being spread apart and positioned over the pipes. Measurement indicia is positioned on a surface of said body, the measurement indicia provides an indication of the length of the cover sections for proper sizing and installation of said cover section on a pipe.

15 Claims, 2 Drawing Sheets

U.S. PATENT DOCUMENTS

| | | | |
|---|---|---|---|
| 5,419,364 | 5/1995 | Trueb et al. | 137/375 |
| 5,454,392 | 10/1995 | Trueb et al. | 137/375 |
| 5,503,193 | 4/1996 | Nygaard | 137/375 X |
| 5,524,669 | 6/1996 | Trueb et al. | 137/375 |
| 5,540,255 | 7/1996 | Trueb et al. | 137/375 |
| 5,564,463 | 10/1996 | Helmsderfer | 137/375 |

COVER ASSEMBLY WITH INTEGRAL MEASUREMENT INDICIA FOR COVERING UNDERSINK PIPING

CROSS REFERENCE TO RELATED APPLICATIONS

This application is a continuation-in-part of U.S. application Ser. No. 08/337,971, entitled "Cover Assembly and Method for Covering Undersink Piping" was filed Nov. 14, 1994, and is now U.S. Pat. No. 5,564,463, and is a continuation-in-part application of U.S. application Ser. No. 08/271,439, entitled "Cover Assembly and Method for Covering Undersink Piping," filed Jul. 7, 1994, now U.S. Pat. No. 5,586,568, which is a continuation-in-part application of U.S. application Ser. No. 08/146,999, entitled "Cover Assembly and Method for Covering Undersink Piping," filed Oct. 29, 1993, now U.S. Pat. No. 5,341,830, and all of these U.S. Pat. Nos. 5,341,830; 5,564,463; and 5,586,568, are completely incorporated herein by reference, in their entireties, and this presently pending application is a continuation-in-part application of application Ser. No. 08/490,599 filed Jun. 6, 1995, entitled "Cover Assembly and Method for Covering Undersink Piping," which is a continuation-in-part application of U.S. application Ser. No. 08/337,971, entitled "Cover Assembly and Method for Covering Undersink Piping," filed Nov. 14, 1994, now U.S. Pat. No. 5,564,463, which is a continuation-in-part application of U.S. application Ser. No. 08/271,439 entitled "Cover Assembly and Method for Covering Undersink Piping," filed Jul. 7, 1994, now U.S. Pat. No. 5,586,568, which is a continuation-in-part application of U.S. application Ser. No. 08/146,999, entitled "Cover Assembly and Method for Covering Undersink Piping," filed Oct. 29, 1993, now U.S. Pat. No. 5,341,830; and this present application is also a continuation-in-part application of U.S. application Ser. No. 08/675,779, filed Jul. 15, 1996, and entitled "Cover Assembly and Method for Covering Undersink Piping," now U.S. Pat. No. 5,649,566, which is a divisional application of U.S. application Ser. No. 08/271,439, noted above.

FIELD OF THE INVENTION

This invention relates generally to undersink piping such as P-trap drains and water supply piping, and specifically discloses apparatus to cover and insulate the undersink drain piping to protect a person from abrasions and burns which may be caused by contact with the piping.

BACKGROUND OF THE INVENTION

Conventionally, water which drains from a sink or basin, such as a restroom sink, travels through the drain opening of the sink and empties into undersink piping. The undersink piping directs the water from the sink into the building's waste water system. The undersink drain piping is commonly referred to as a "P-trap" drain assembly, and "P-trap" assemblies are common to many sinks in both commercial and residential applications.

The P-trap assembly generally includes a vertical pipe section which extends downwardly from the sink drain opening and extends below the sink to couple with a J-shaped pipe section. The J-shaped pipe section makes a 180° bend and then extends vertically upward to couple with an L-shaped pipe section which makes a 90° bend from the J-shaped section to extend generally horizontally into the wall to connect the P-trap with the waste water system of the building. The P-trap creates a vapor barrier preventing undesirable vapors from passing back into the building through the drain piping. The J-shaped section also serves the purpose of capturing or trapping any foreign objects which fall down the drain and which may become lodged in the waste water drainage system therefore clogging the system, hence the name "P-trap". Under the force of gravity, any foreign objects will sit in the bottom of the J-shaped section to be subsequently removed, such as by a plumber.

Also extending below sinks are hot and cold water supply pipes commonly referred to as supply water angle valves, which include supply line sections which extend generally horizontally from the wall to connect to a valve and faucet line sections that extend generally vertically upward from the valve to connect to the sink faucet apparatus.

Current building regulations require that restroom facilities in a public building, such as restroom sinks, be accessible to all people, including disabled persons and particularly those disabled persons who must use a wheelchair. Persons in wheelchairs must often maneuver the chair partially under the sink to access it. Since the water supply pipes and P-trap drain pipes protrude from the wall under the sink there is a risk of abrasions to the person's legs from the hard piping or even burns from the temperature of the piping which is heated by the water passing therethrough. The current federal and state regulations regarding undersink piping, most notably the Americans With Disabilities Act (ADA), require that the P-trap and water supply piping be covered and insulated so as to protect a person using the sink from being burned or from incurring injuries from impact with the piping. As a result of these regulations, various methods and apparatuses have been utilized to try and adequately cover and insulate undersink P-traps and water supply piping.

In the past, one of the more popular methods of insulation was to utilize loose foam insulation which was wrapped around the piping. However, traditional foam insulation usually fits poorly and is difficult to secure resulting in wasted time and frustration by the plumber or other installer. Furthermore, the foam wrap, due to its poor fit and inadequate securing means, is not very aesthetically pleasing in its appearance. Additionally, the ribbed construction of a wrapped pipe leaves ridges and cavities which trap dirt and other bacteria under the sink.

Various other methods and apparatuses have been utilized to cover a P-trap beneath a sink as is evidenced by various patents in the field. However, besides having other drawbacks, many of these other devices and methods are still difficult and time consuming to install. For example, one such apparatus utilizes three separate pieces which must each be individually placed around a pipe section and secured thereon. Before installation, the pieces have to be individually cut apart from each other and then trimmed to fit properly. Such an installation process generally requires no less than three or four cuts of the unitary insulative piece to separate the pieces and sometimes even six cuts for completing the subsequent trimming and fitting of the pieces. Thus, the process is somewhat cumbersome and slow.

Inherent in such cutting and trimming procedures is the requirement that the installer measure each of the pieces for the proper fit. The measurement steps which are necessary further slow down the installation process. For example, undersink piping assemblies use pipes which are not uniform in their dimensions, and particularly not uniform in their length dimensions from assembly to assembly. As may be appreciated, an installer will have to measure the pipes and then transfer that measurement to the various insulation pieces. That is, they will have to individually measure and mark each insulation piece before trimming. Even if the proper measurement tools are available, the measurement steps are time consuming and tedious because they must be accurately transformed to several cylindrically-shaped pieces of insulation. Additionally, once the measurement of the pipes is complete, it often is not readily apparent to an installer what dimensions are actually to be measured on the insulation pieces, particularly if the installer, such as a plumber, has never made such an installation. Furthermore, since the insulative pieces themselves have circular cross sections and therefore are difficult to manipulate for transferring the measurement thereto, the process is still tedious even if the installer knows what to do.

As well, the interior surfaces of the insulation pieces, which is where the measurement marks are usually made in order to preserve the exterior appearance of the covers, may be resistant to many commonly used marking devices.

Consequently, various of the prior art apparatuses require an inefficient, and therefore, costly installation procedure making them particularly undesirable to the facility owner who is paying for the time that is required from the hassle presented by some of the prior art apparatuses and the measurement steps necessary at installation make these prior art devices undesirable to the installer as well.

Accordingly, there is still a need for a simple and sanitary P-trap cover assembly and method which addresses the shortcomings of the existing devices and methods.

It is therefore an objective of the present invention to provide such a cover assembly and method which addresses the shortcomings of prior art devices and is still effective to prevent a disabled person from being burned or bruised and cut by the undersink piping when using a sink.

It is further an objective to provide proper insulation while reducing the complexity of the installation procedure, and particularly reducing the complexity of the measurement and trimming procedures necessary for proper installation.

It is still another objective to eliminate some of the steps that have been necessary in the past for proper installation.

It is still another objective to make the installation process easier and faster, and thus, more cost efficient.

SUMMARY OF THE INVENTION

The above-discussed objectives and other objectives are achieved by the insulative cover assembly of the present invention which eliminates the necessity of having to specifically measure and mark each insulation piece during installation. In that way, the installation process is made more accurate quicker and with greater cost efficiency.

The insulative cover assembly of the present invention comprises a unitary body including a first cover section and a second cover section coupled together. The first and second cover sections of the unitary body are separateable to form individual cover pieces for covering the respective undersink pipes. The first cover piece has an elongated body terminating in an approximately 180° bend at an end of the piece and the second cover piece has an elongated body terminating in an approximately 90° bend at the end of that piece. The unitary body includes a longitudinal slit thereon, and therefore, each cover piece, when separated from each other, may be spread apart and positioned over the respective pipes.

In accordance with the principles of the present invention, the unitary body includes measurement indicia formed thereon which extends along a longitudinal dimension of the unitary body. The measurement indicia is formed on an inside surface of the body and provides an indication of the length of each of the cover pieces. The measurement indicia further takes into account the lengths of the curved bend portions of each piece. This feature is particularly helpful to insure proper measurement and installation of the particular section on a respective pipe.

The measurement indicia has two sections, with each section corresponding to a respective cover section or cover piece. The measurement indicia is referenced to the end of a respective cover section, and particularly, to the end of the cover section having a respective bend. The measurement indicia includes a plurality of successive numerical markings and corresponding hash marks to provide a numerical indication of the length of the section in a particular unit of length, such as inches. A metric unit of length might also be utilized. The length is measured from the reference point at the bend portion of the cover section.

To properly install the insulative cover assembly of the invention, a measurement is made from the bottommost point on the J-shaped pipe to the end of the straight pipe closest to the drain sink. Another length measurement is made from forwardmost point at the 90° bend of the L-shaped pipe to the end of the L-shaped pipe proximate the wall. Once these two measurements have been made, an installer only has to look at the indicia in the unitary body of the invention for the numerical marking corresponding to the measured length of one of the particular pipes. The shaped sections of the unitary body, of course, must be matched up with the proper pipe so that the indicia corresponds to the measurement that pipe. A cut is then made along the unitary body at that numerical marking, and the proper length of the cover piece is achieved. The first cut made will separate the unitary body into the respective cover pieces. Similarly, the corresponding numerical marking for the other cover piece is found and a cut is made thereon. Generally only two cuts are made to provide cover pieces having the proper length and no independent measurement of the cover pieces or marking thereof is required. The present invention reduces the number of steps necessary to make a proper installation and thus makes the installation process easier, quicker and more cost efficient. Furthermore, the installer no longer has to worry whether he has the proper marking tool to make a mark on the cover pieces.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

Figure 1:
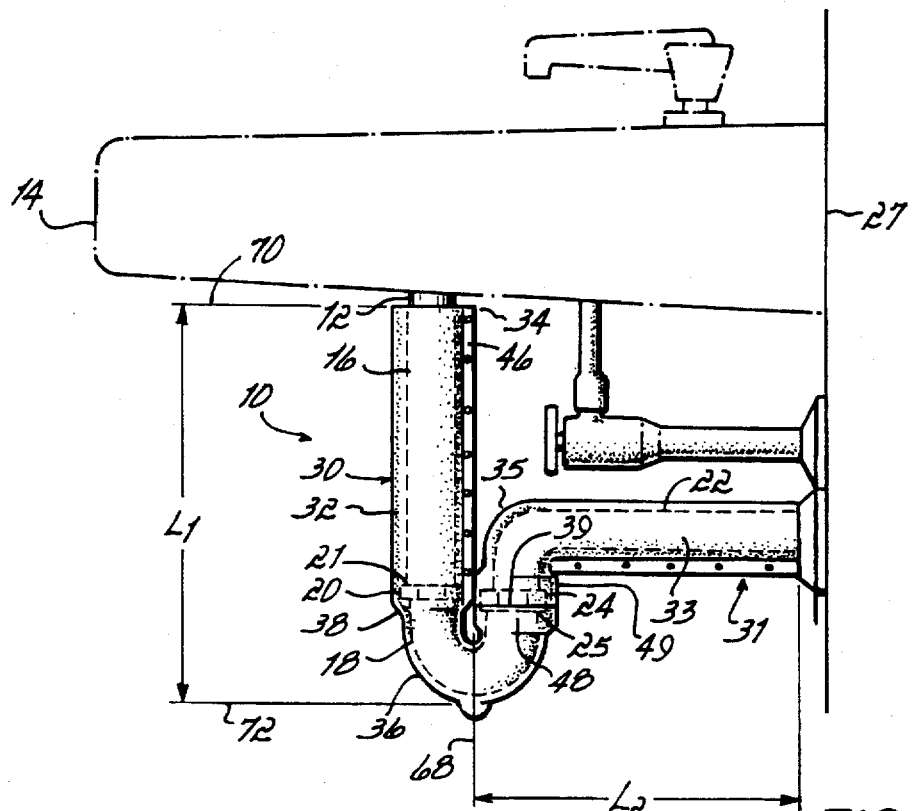
FIG. 1 is a side view of the invention in use to cover an undersink pipe assembly.

FIG. 1 illustrates the insulative cover assembly 10 of the present invention as installed on a P-trap drain piping assembly 12 underneath a sink 14. The insulative cover assembly 10 is positioned on the drain piping assembly 12 in order to cover and insulate the piping and reduce or prevent burns and abrasions of a handicapped person in a wheelchair coming into contact with the piping. The drain piping assembly 12 under sink 14 is essentially divided into three pipes shown by dashed lines. A straight pipe 16 extends downwardly from the sink drain (not shown) and attaches to one side of a J-shaped pipe or "trap" pipe 18, which is attached to straight pipe 16 by a pipe nut 20 at the juncture 21 between the pipes 16, 18. An L-shaped pipe 22 is joined to the other side of the J-shaped pipe 18 by a similar pipe nut 24 at juncture 25. The L-shaped pipe 22 extends back into the wall to dispose of waste water draining from sink 14. Juncture 21 is the forwardmost juncture from the wall 27 which supports sink 14 and piping 12 and thus is referred to herein as a forward juncture. Juncture 25 is a rearward juncture.

The insulative cover assembly 10 includes a first cover piece 30. First cover piece 30 has a generally elongated body with a generally linear portion 32 making up comprising a substantial portion of its length. When the first cover piece 30 is placed over pipes of the drain piping assembly 12, an end 34 of linear portion 32 abuts generally against the bottom of the drain of sink 14 (see FIG. 1 ). The other end of the first cover piece 30 terminates in an approximately 180° bend portion 36 which extends from end 38 of the linear portion 32. The first cover piece 30 has a longitudinal slit 40 along its length from the first end 34 of linear portion 32 to an end 39 of the bend portion 36 for being spread apart and positioned over the pipes 16, 18.

A second cover piece 31 covers the L-shaped pipe 22. Second cover piece 31 has a body including linear portion 33 and terminating in an approximately 90° bend portion 35. The 90° bend portion 35 couples with and abuts to end 39 of the first cover piece to cover juncture 25 and thus provide complete insulation of pipe assembly 12. Longitudinal slit 40 allows the second cover piece 31 to be spread apart and installed in a manner similar to the first cover piece as discussed below.

Figure 2:
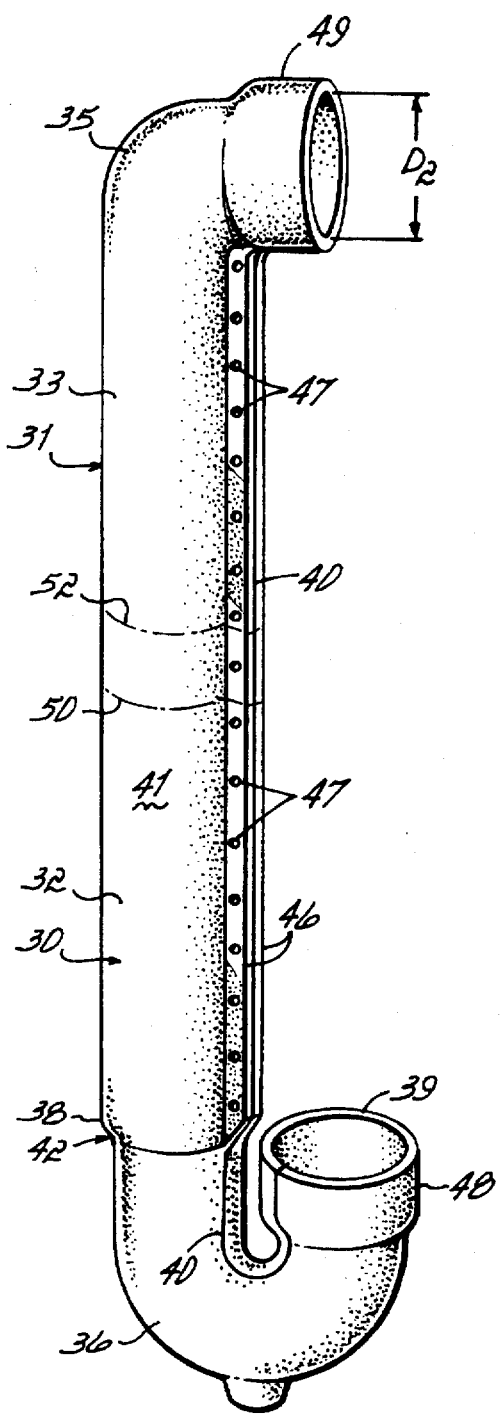
FIG. 2 is a perspective view of an embodiment of the present invention.

FIG. 2 is a perspective view of the first cover piece 30 and second cover piece 31 coupled together to form a unitary body 41. Unitary body 41 may be shipped as shown in FIG. 2 and includes all of the necessary cover pieces for covering and insulating piping assembly 12. The unitary body 41 preferably has a generally circular cross-section for a proper fit on the pipes and is separateable into the individual cover pieces as described below.

As illustrated in FIGS. 1 and 2, bend portion 36 of the first cover piece 30 is configured to have an inner diameter $D_1$ which is generally close in dimension to the outer diameter of the J-shaped pipe 18 such that there is very little room for the bend portion 36 to move or shift on the J-shaped pipe 18 when cover assembly 10 is installed. However, the J-shaped pipe 18 is joined to straight pipe 16 by pipe nut 20, which has a larger outer diameter than both the J-shaped pipe 18 and the straight pipe 16. Straight pipe 16 usually maintains an outer diameter similar to the outer diameter of the J-shaped pipe 18.

To provide proper installation, linear portion 32 of the first cover piece 30 increases to a larger inner diameter $D_2$ at a transition region 42 proximate juncture 21. Linear portion 32 increases from the first diameter $D_1$ of the 180° bend portion to a larger second diameter $D_2$, so that the first cover piece 30 can be positioned over the larger diameter pipe nut 20 and so that cover piece 30 simultaneously and continuously covers pipes 16, 18, pipe nut 20 and juncture 21.

Linear portion 32 maintains the increased diameter $D_2$ from transition region 42 up to the end 34 where it joins with the second cover piece 31 to form the unitary body 41. (See FIG. 2 ) In a preferred embodiment of the invention, transition region 42 is gradually increased in diameter from $D_1$ to $D_2$ to give a smooth appearance.

Second cover piece 31 has the linear portion 33 which maintains the inner diameter $D_2$ until the 90° bend portion 35 where it increases to form an enlarged portion or collar 49. Referring to FIG. 2, the first cover piece 30 also has a collar 48 positioned proximate the 180° bend portion 36. Collar 48 is approximately equal in dimension to $D_2$ so that the collar 48 covers juncture 25 and pipe nut 24 as illustrated in FIG. 1. Collar 49 is dimensioned to also have an inner diameter approximately equal to $D_2$ so as to cover nut 24 and juncture 25 and abut against collar 8. The cover pieces 30, 31 and abutting collars 48, 49 provide complete insulative coverage for the piping assembly.

Unitary body 39 has a opposing flanges 46 formed thereon which extend along the length of the body generally along the adjacent linear portions 32,33 of the cover pieces. Flange 46 includes a series of aperture pairs 47 formed therein for receiving fastening structures. The apertures 47 of each pair are positioned, one on either side of the longitudinal slit 40, and are axially aligned with each other. When unitary body 39 is separated into the separate cover pieces 30, 31, the cover pieces are spread apart at the slit to be placed around the pipes. Fasteners (not shown), such as cable ties, are placed in the apertures and through each pair and are secured to effectively close the slit 40 and secure the cover pieces.

FIG. 2 illustrates the first cover piece 30 and second cover piece 31 coupled together to a form unitary body 41 which is then separated into the individual cover pieces during the installation process as discussed further hereinbelow. To that end, unitary body includes a first cover section (corresponding to the first cover piece 30) and a second cover section (corresponding to the second cover piece 31 ). For reference herein, the first cover piece or first section 30 and the second cover piece or second section 31 will be given similar reference numerals, although, the term "section" will generally refer to the unitary body while the term "piece" will refer to the separate insulative cover pieces measured and formed from the unitary body 39 in accordance with the principles of the invention.

Figure 3:
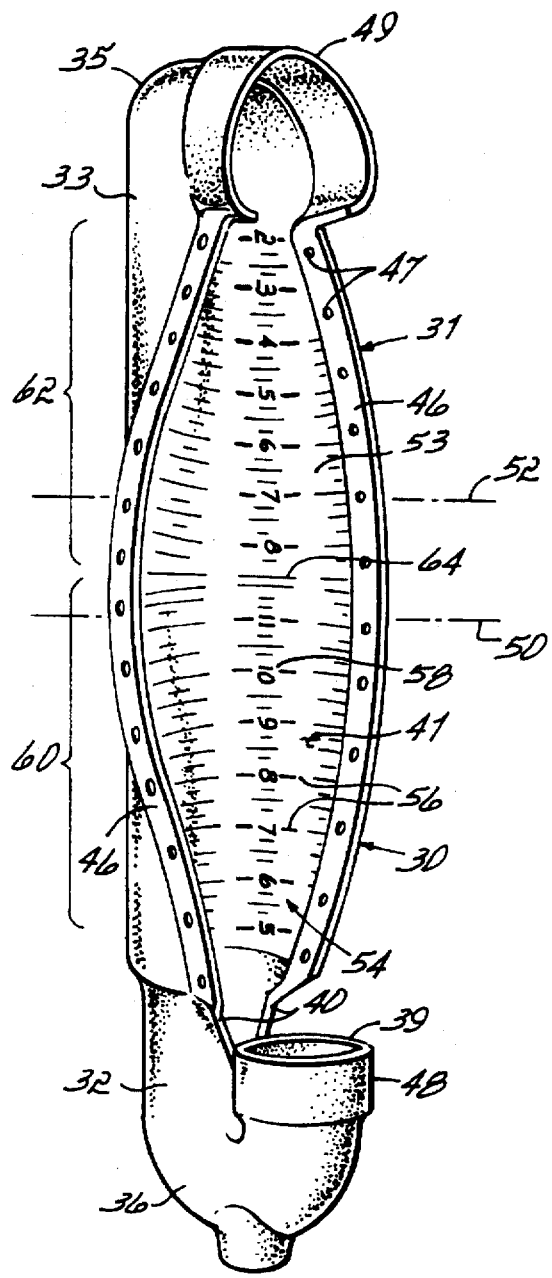
FIG. 3 is a perspective view of the embodiment of FIG. 2, shown spread open to reveal the measurement indicia.

Generally, the respective cover pieces will bey be appreciated, cut lines 50, 52 in FIG. 3 are merely illustrative and may be positioned elsewhere on the unitary body 39 depending upon the lengths of the pipes to be covered, Referring now to FIG. 3, unitary body 41 further comprises measurement indicia 54 formed and positioned on an inside surface 53 of the body. The measurement indicia provides an indication of length of the cover sections 30, 31 so that measurement and marking of those individual sections is not necessary. More specifically, the measurement indicia 54 comprises a series of hash marks 56 which extend successively in the longitudinal direction on the inside surface 53 of the unitary body 39. The measurement indicia includes successive numerical markings 58 corresponding to the hash marks for providing a numerical indication of the length of a particular cover section in a standard unit of length. In a preferred embodiment of the invention, the numerical markings correspond to the lengths of cover sections in inches. In one embodiment, the hash marks are separated by approximately ¼ of an inch. As may be appreciated, a metric system of measurement or some other system of measurement might also be utilized. Furthermore, more or less hash marks might be utilized for finer or courser measurements of length in accordance with the principles of the invention.

The indicia 54 includes a first section 60 and a second section 62 which correspond respectively to the lengths of the first cover piece 30 and the second cover piece 31. The first indicia section 60 provides a measurement of the length of the first cover piece 30 while the second indicia 62 provides in indication of the length, in inches, of the second cover piece 31. In a preferred embodiment, as illustrated in FIG. 3, the indicia sections 60, 62 share a common reference point, indicated at line 64, to indicate the end of each indicia section.

Figure 4:
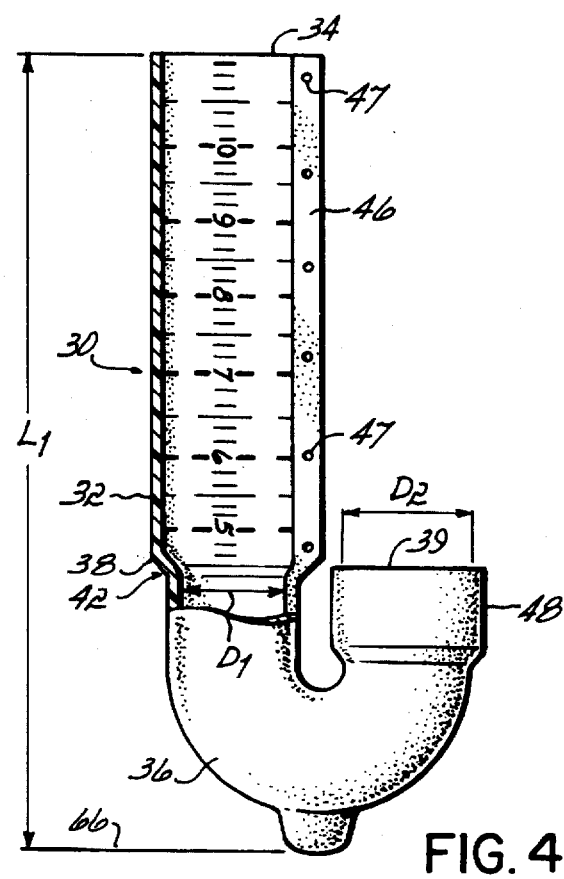
FIG. 4 is a side view in partial cross-section of a cover section of the invention after it is measured and cut in accordance with the principles of the invention.

The measurement indicia is referenced to or originates at the endmost or outwardmost point of the respective bend of the cover section. For example, referring to FIG. 4, the length $L_1$ of cover piece 30 is referenced from the endmost point or line 66 on the approximately 180° bend portion 36. The indicia marks 56 and numerals 58 indicate the length, in inches, along the cover piece from the origin point or reference point 66. Similarly, the length $L_2$ of the second cover piece 31 is referenced to the outwardmost point or line 68 on the approximately 90° bend portion 35. In that way, $L_2$ indicates the length of the second cover piece 31 from the origin or reference point 68 (see FIG. 1).

To install cover pieces 30, 31, in accordance with the principles of the present invention, length measurements are made of the respective undersink pipes. Referring to FIG. 1, the measurement is made from an upper end of the straight pipe 16 indicated by line 70 to the bottom of the J-shaped pipe 18 indicated by line 72. That measured length is designated at $L_1$ corresponding to the length of the necessary first cover piece 30 (see FIG. 4). Once $L_1$ is determined, for example, to be approximately 11 inches, the hash mark on the measurement indicia 54 corresponding to 11 inches is located and a cut is made thereon as indicated by cut line 50. Similarly, the length of $L_2$ is measured (See FIG. 1), and a corresponding hash mark on the measurement indicia 54, for example, 7 inches, is located and a cut is made thereon as indicated by cut line 52.

Accordingly, two separate cover pieces 30, 31 are produced by the unitary body 39 and have the proper length for adequately covering the undersink piping. Only two cuts are necessary for proper fitting pieces, and no measuring and marking of the cover pieces is necessary. As illustrated in FIG. 1, the cover pieces are spread along the longitudinal slit 40 and positioned over the pipe such that the collars 48, 49 of the cover pieces abut at juncture 25. Again, only two cuts are required for the installation, and since no separate measurement and marking of the cover pieces is required, the installation process is quicker, easier and more cost efficient than installations involving prior art devices.

Once the cover pieces 30, 31 have been properly measured and have been positioned on the respective pipes, fastening structures, such as cable ties, are placed in the apertures 47 formed in flanges 46 for securing the cover pieces to the pipes.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. According to the scope of applicant's general inventive concept.

What is claimed is:

1. An insulative cover assembly for insulating a P-trap drain piping assembly located under a sink including a straight pipe, a J-shaped pipe, and an L-shaped pipe joined together at junctures by pipe nuts, the cover assembly comprising:

a unitary body including a first cover section and a second cover section coupled together, the first cover section having an elongated body terminating in an approximately 180° bend at an end of said first section, and the second cover section having an elongated body terminating in an approximately 90° bend at an end of said second section, the first and second cover sections being separable for covering the pipes;

the first and second cover sections each including a longitudinal slit thereon for being spread apart and positioned over the pipes;

measurement indicia positioned on a surface of said body, the measurement indicia being formed on an inside surface of said body and providing an indication of length of at least one of the cover sections for proper sizing and installation of said cover section on a pipe;

whereby the piping assembly is quickly and efficiently covered and insulated.

2. The insulative cover assembly of claim 1 wherein the measurement indicia is referenced to the end of the cover section having a bend.

3. The insulative cover assembly of claim 1 wherein the measurement indicia includes at least two sections for providing separate indications of length for both the first and second cover sections.

4. The insulative cover assembly of claim 3 wherein said indicia sections have a common reference point for indicating the length of the cover sections.

5. The insulative cover assembly of claim 1 wherein the measurement indicia has at least one numerical marking therewith for providing a numerical indication of the length of the cover section in a unit of length.

6. The insulative cover assembly of claim 1 wherein the measurement indicia indicates the length of the cover section in inches.

7. An insulative cover assembly for insulating a pipe of a P-trap drain piping assembly located under a sink, the cover assembly comprising:

a cover piece having a generally elongated body and configured for being positioned over a pipe to insulate the pipe;

the cover piece having a longitudinal slit thereon for being spread apart and positioned over a pipe;

measurement indicia positioned on a surface of said cover piece, the measurement indicia being formed on an inside surface of said body and providing an indication of the length of the cover piece for proper sizing and installation of said piece on a pipe;

whereby the piping assembly is quickly and efficiently covered and insulated.

8. The insulative cover assembly of claim 7 further comprising a second cover piece for covering a second pipe, the second cover piece including measurement indicia positioned on a surface thereof for providing an indication of the length of the second cover piece.

9. The insulative cover assembly of claim 8 wherein said cover pieces are originally joined together for forming a unitary structure and are separateable into the cover pieces.

10. The insulative cover assembly of claim 9 wherein said measurement indicia for the pieces have a common reference point for indicating the length of the cover pieces.

11. The insulative cover assembly of claim 7 wherein the measurement indicia is referenced to an end of the cover piece.

12. The insulative cover assembly of claim 7 wherein the measurement indicia has at least one numerical marking therewith for providing a numerical indication of the length of the cover piece in a unit of length.

13. The insulative cover assembly of claim 7 wherein the measurement indicia indicates the length of the cover piece in inches.

14. The insulative cover assembly of claim 7 wherein said cover piece has at least one of an approximately 180° bend and an approximately 90° bend.

15. The insulative cover assembly of claim 14 wherein the measurement indicia is referenced to a point on the bend of the cover.

* * * * *